(12) United States Patent
Yu

(10) Patent No.: US 11,973,196 B2
(45) Date of Patent: Apr. 30, 2024

(54) POSITIVE ELECTRODE PLATE, AND ELECTROCHEMICAL APPARATUS AND DEVICE ASSOCIATED THEREWITH

(71) Applicant: CONTEMPORARY AMPEREX TECHNOLOGY CO., LIMITED, Ningde (CN)

(72) Inventor: Yang Yu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 75 days.

(21) Appl. No.: 17/589,711

(22) Filed: Jan. 31, 2022

(65) Prior Publication Data
US 2022/0158258 A1    May 19, 2022

Related U.S. Application Data

(63) Continuation of application No. PCT/CN2020/106468, filed on Jul. 31, 2020.

(30) Foreign Application Priority Data

Aug. 8, 2019 (CN) .......................... 201910731186.0

(51) Int. Cl.
*H01M 10/42* (2006.01)
*H01M 4/13* (2010.01)
(Continued)

(52) U.S. Cl.
CPC .......... *H01M 10/4235* (2013.01); *H01M 4/13* (2013.01); *H01M 10/0525* (2013.01); *H01M 2004/028* (2013.01)

(58) Field of Classification Search
CPC .............. H01M 10/4235; H01M 4/13; H01M 10/0525; H01M 2004/028; H01M 4/62;
(Continued)

(56) References Cited

U.S. PATENT DOCUMENTS

| 2011/0236761 A1 | 9/2011 | Endo et al. |
| 2013/0196230 A1 | 8/2013 | Yokouchi et al. |

(Continued)

FOREIGN PATENT DOCUMENTS

| CN | 103097472 A | 5/2013 |
| CN | 103503209 A | 1/2014 |

(Continued)

OTHER PUBLICATIONS

Contemporary Amperex Technology Co. Limited, International Search Report and Written Opinion, PCT/CN2020/106468, Oct. 29, 2020, 20 pgs.

(Continued)

*Primary Examiner* — Nathanael T Zemui
*Assistant Examiner* — Gary D Harris
(74) *Attorney, Agent, or Firm* — Kilpatrick Townsend & Stockton LLP

(57) ABSTRACT

This application provides a positive electrode plate and an electrochemical apparatus containing such positive electrode plate. The positive electrode plate includes a positive electrode current collector, a positive electrode active material layer disposed on at least one surface of the positive electrode current collector, and a safety layer disposed between the positive electrode active material layer and the positive electrode current collector. The safety layer includes a binding substance, a conductive substance, and a special sensitive substance. Each molecule of the special sensitive substance includes monosaccharide structural units, and carbonate groups and/or phosphate groups; and at least part of the carbonate groups and/or phosphate groups are bonded to two or more of the monosaccharide structural units. The electrochemical apparatus prepared by using the positive electrode plate of this application has significantly (Continued)

5 improved safety and electrical performance (such as cycling performance).

17 Claims, 3 Drawing Sheets

(51) Int. Cl.
*H01M 10/0525* (2010.01)
*H01M 4/02* (2006.01)

(58) Field of Classification Search
CPC ...... H01M 4/622; H01M 4/623; H01M 4/624; H01M 4/625; H01M 4/626; H01M 50/574; Y02E 60/10
USPC .......................................................... 429/126
See application file for complete search history.

(56) References Cited

U.S. PATENT DOCUMENTS

| | | | |
|---|---|---|---|
| 2014/0065491 A1 | 3/2014 | Yokouchi et al. | |
| 2014/0120423 A1 | 5/2014 | Matsuo et al. | |
| 2014/0342200 A1 | 11/2014 | Morita et al. | |
| 2015/0255788 A1 | 9/2015 | Yokouchi et al. | |
| 2018/0294472 A1 | 10/2018 | Fan | |
| 2019/0140281 A1 | 5/2019 | Li et al. | |
| 2019/0140328 A1 | 5/2019 | Li et al. | |
| 2020/0083527 A1 | 3/2020 | Nakamura | |
| 2020/0381774 A1* | 12/2020 | Ueno | H01M 50/172 |
| 2021/0143436 A1 | 5/2021 | Yu | |

FOREIGN PATENT DOCUMENTS

| | | | |
|---|---|---|---|
| CN | 103636032 A | 3/2014 | |
| CN | 104409681 A | 3/2015 | |
| CN | 104662713 A | 5/2015 | |
| CN | 105810885 A | 7/2016 | |
| CN | 106099043 A | 11/2016 | |
| CN | 107768589 A | 3/2018 | |
| CN | 108091825 A | 5/2018 | |
| CN | 108258249 A | 7/2018 | |
| CN | 109786708 A | 7/2018 | |
| CN | 108987666 A | 12/2018 | |
| CN | 208298954 U | 12/2018 | |
| CN | 109755466 A | 5/2019 | |
| CN | 110265665 A | 9/2019 | |
| CN | 110400933 A | 11/2019 | |
| CN | 110429240 A | 11/2019 | |
| CN | 110444764 A | 11/2019 | |
| CN | 110474114 A | 11/2019 | |
| CN | 111212449 A | 5/2020 | |
| EP | 3483900 A1 | 5/2019 | |
| EP | 3483900 A1 | 5/2019 | |
| EP | 3809502 A1 | 4/2021 | |
| EP | 3859824 A1 | 8/2021 | |
| JP | H08329978 A | 12/1996 | |
| JP | 2010108716 A | 5/2010 | |
| JP | 2010135338 A | 6/2010 | |
| JP | 5672113 B2 | 2/2015 | |
| JP | 2015216007 A | 12/2015 | |
| JP | 2016076439 A | 5/2016 | |
| JP | 2000100437 A | 5/2019 | |
| JP | 2019114393 A | 7/2019 | |
| WO | 2016163282 A1 | 10/2016 | |
| WO | 2018180742 A1 | 10/2018 | |

OTHER PUBLICATIONS

Contemporary Amperex Technology Co. Limited, Extended European Search Report, EP20850953.9, Jul. 28, 2022, 7 pgs.
Ningder Age New Energy Technolgy Co. Ltd., First Office Action, CN201910731186.0, Jun. 3, 2020, 11 pgs.
The Extended European Search Report received in the corresponding European Application 20850953.9, mailed Jul. 28, 2022.
The Extended European Search Report received in the corresponding European Application 20949122.4, mailed May 10, 2023.
Anonymous: "Characterization method of compaction density of cathode and electrode materials for lithium b", Jul. 5, 2020 (Jul. 5, 2020), XP093042932, Retrieved from the Internet: URL:https://www.iesttech.com/en/NewsDetail2254816.html [retrieved on Apr. 28, 2023].
Anonymous: "Transition metal—Wikipedia", Jan. 1, 2000 (Jan. 1, 2000), XP093032392, Retrieved from the Internet: URL:https://en.wikipedia.org/wiki/Transition_metal [retrieved on Mar. 16, 2023].
Notification to Grant Patent Right for Invention received in the corresponding Chinese application 201910731214.9, mailed Oct. 26, 2020.
First Office Action received in the corresponding Chinese application 201910731214.9, mailed Jan. 6, 2020.
Extended European search report received in the corresponding European application 20849080.5, mailed Jun. 29, 2022.
First Office Action received in the corresponding European application 20849080.5, mailed Oct. 21, 2022.
Safety Issues in Lithium Ion Batteries: Materials and Cell Design, Xiangkun Wu, Kaifang Song, Xiaoyan Zhang, Naifang Hu, Liyuan Li, Wenjie Li, Lan Zhang and Haitao Zhang, Frontiers in Energy Research , vol. 7, Jul. 17, 2019 (Jul. 17, 2019), XP055968523.
Notice of Allowance received in the corresponding U.S. Appl. No. 17/589,705, mailed Oct. 26, 2023.
Notice of Allowance received in the corresponding U.S. Appl. No. 17/589,714, mailed Sep. 22, 2023.
Extended European search report received in the corresonding European application 20850741.8, mailed Aug. 1, 2022.
International search report received in the corresponding international application PCT/CN2020/106467, mailed Oct. 27, 2020.
Written Opinion of ISA received in the corresponding international application PCT/CN2020/106467, mailed Oct. 27, 2020.
International search report received in the corresponding international application PCT/CN2020/106474, mailed Oct. 28, 2020.
Written Opinion of ISA received in the corresponding international application PCT/CN2020/106474, mailed Oct. 28, 2020.

* cited by examiner

POSITIVE ELECTRODE PLATE, AND ELECTROCHEMICAL APPARATUS AND DEVICE ASSOCIATED THEREWITH

CROSS-REFERENCE TO RELATED APPLICATIONS

This application is a continuation application of PCT Patent Application No. PCT/CN2020/106468, entitled "POSITIVE ELECTRODE PLATE, AND ELECTROCHEMICAL APPARATUS AND DEVICE ASSOCIATED THEREWITH" filed on Jul. 31, 2020, which claims priority to Chinese Patent Application No. 201910731186.0, filed with the China National Intellectual Property Administration on Aug. 8, 2019 and entitled "POSITIVE ELECTRODE PLATE AND ELECTROCHEMICAL APPARATUS CONTAINING SUCH POSITIVE ELECTRODE PLATE", both of which are incorporated herein by reference in their entirety.

This application is related to U.S. application Ser. No. 17/589,705, entitled "POSITIVE ELECTRODE PLATE, AND ELECTROCHEMICAL APPARATUS AND DEVICE ASSOCIATED THEREWITH" filed on Jan. 31, 2022, which is incorporated by reference in its entirety.

This application is related to U.S. application Ser. No. 17/589,714, entitled "ELECTROCHEMICAL ENERGY STORAGE APPARATUS AND DEVICE" filed on Jan. 31, 2022, which is incorporated by reference in its entirety.

TECHNICAL FIELD

This application relates to the electrochemical filed, and in particular to a positive electrode plate and an electrochemical apparatus and device associated therewith.

BACKGROUND

Lithium-ion batteries are widely applied to electric vehicles and consumer electronic products due to their advantages such as high energy density, high output power, long cycle life, and low environmental pollution. However, lithium-ion batteries sometimes have safety issues such as fire and explosion during overcharging, which poses a great threat to the safety of people's lives and property. In addition, the recycling rate of lithium-ion batteries has also been questioned.

Overcharge of a lithium-ion battery generally deteriorates its electrical performance, resulting in lithium precipitation on its negative electrode, which significantly deteriorates electrical performance such as cycling and capacity, and even causes short circuit in the battery. Results of a large number of experiments show that short circuit in the battery is the root cause of safety hazards of lithium-ion batteries. Researchers have tried to make improvements in many aspects in an attempt to avoid in-battery short circuit, including research on exploiting properties of PTC (Positive Temperature Coefficient) materials to improve safety performance of lithium-ion batteries. PTC materials, also referred to as positive temperature coefficient thermal materials, are characterized in having electric resistivity that increases with temperature. When the temperature exceeds a particular threshold, electric resistivity of a PTC material steps up rapidly.

A known typical practice to improve safety of a lithium-ion battery is adding a PTC material to an active material layer of the battery. As the battery temperature rises, resistance of the PTC material grows, increasing resistance of the entire active material layer, and even damaging the charge conducting path of the entire active material layer, thus cutting off the power and prohibiting further electrochemical reaction. However, experiments have shown that the PTC material added to the active material layer has an adverse effect on electrochemical performance of the battery.

It has also been reported that a separate PTC material layer could be disposed between a current collector and an active material layer of a lithium-ion battery. As the battery temperature rises, resistance of the PTC material layer grows, increasing resistance between the current collector and the active material layer, and even cutting off the power, thus prohibiting further electrochemical reaction. However, according to such method of improvement, when an active material slurry is applied onto a surface of the PTC material layer, a solvent in the slurry (such as NMP) will dissolve the PTC material in the PTC layer and enter an upper active material layer, which not only makes the PTC layer lose PTC effect but also deteriorates electrical performance of the lithium-ion battery. In addition, in a compaction step for preparing an electrode plate, the PTC material layer is extremely easy to be taken to the edge because of squeezing, resulting in direct contact between the active material layer and the current collector, thereby failing to improve the safety performance. In addition, performances such as response speed and current blocking effect of the PTC material layer all need to be greatly improved.

SUMMARY

Some embodiments of this application provide a positive electrode plate with improved safety and electrical performance (such as cycling performance) and an electrochemical apparatus and device associated therewith.

According to one aspect, this application provides a positive electrode plate, including a positive electrode current collector, a positive electrode active material layer disposed on at least one surface of the positive electrode current collector, and a safety layer disposed between the positive electrode active material layer and the positive electrode current collector. The safety layer includes a binding substance, a conductive substance, and a special sensitive substance. Each molecule of the special sensitive substance includes monosaccharide structural units, and carbonate groups and/or phosphate groups; and at least part of the carbonate groups and/or phosphate groups are bonded to two or more of the monosaccharide structural units.

According to another aspect, this application provides an electrochemical apparatus, including the positive electrode plate according to the first aspect of this application.

According to this application, when overcharge occurs, excessive voltage and certain temperature will cause the special sensitive substance in the safety layer of the positive electrode plate to be degraded, thus damaging a charge conducting network in the safety layer, blocking electronic conduction between the positive electrode current collector and the positive electrode activity material layer, thereby cutting off a charging current in time, effectively preventing the electrochemical apparatus from thermal runaway, and avoiding safety problems such as fire and explosion, which greatly improves overcharge safety performance of the electrochemical apparatus.

Compared with a positive electrode plate and an electrochemical apparatus that use a traditional PTC material as a safety layer or use an active material layer containing a PTC material, the positive electrode plate and the electrochemical apparatus including such positive electrode plate in this application undergo chemical changes first instead of physical changes at excessive high voltage and certain temperature, providing faster response, controllable response voltage, better overcharge safety and reliability, and improved electrical performance (such as cycling performance) of the electrochemical apparatus. The traditional PTC material whose volume swelling relies on changes in crystallinity only undergoes physical changes at high temperature. Such change is greatly affected by preparation processes of a material coating and the electrochemical apparatus. For example, temperature and coating speed in the preparation process of the material coating and an electrolyte in the electrochemical apparatus all have an uncontrollable effect on crystallinity of the material. When the electrochemical apparatus is overcharged, the material may probably not be excited, and therefore the charging current cannot be cut off in time, posing a safety hazard.

According to another aspect, this application provides a battery module including the foregoing electrochemical apparatus.

According to still another aspect, this application provides a battery pack including the foregoing battery module.

According to a still further aspect, this application provides a device including the foregoing electrochemical apparatus. The electrochemical apparatus can be used as a power source of the device, and or can also be used as an energy storage unit of the device.

The battery module, battery pack, and device in this application include the electrochemical apparatus provided by this application, and therefore have at least the same advantages as the electrochemical device in this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

Figure 1:
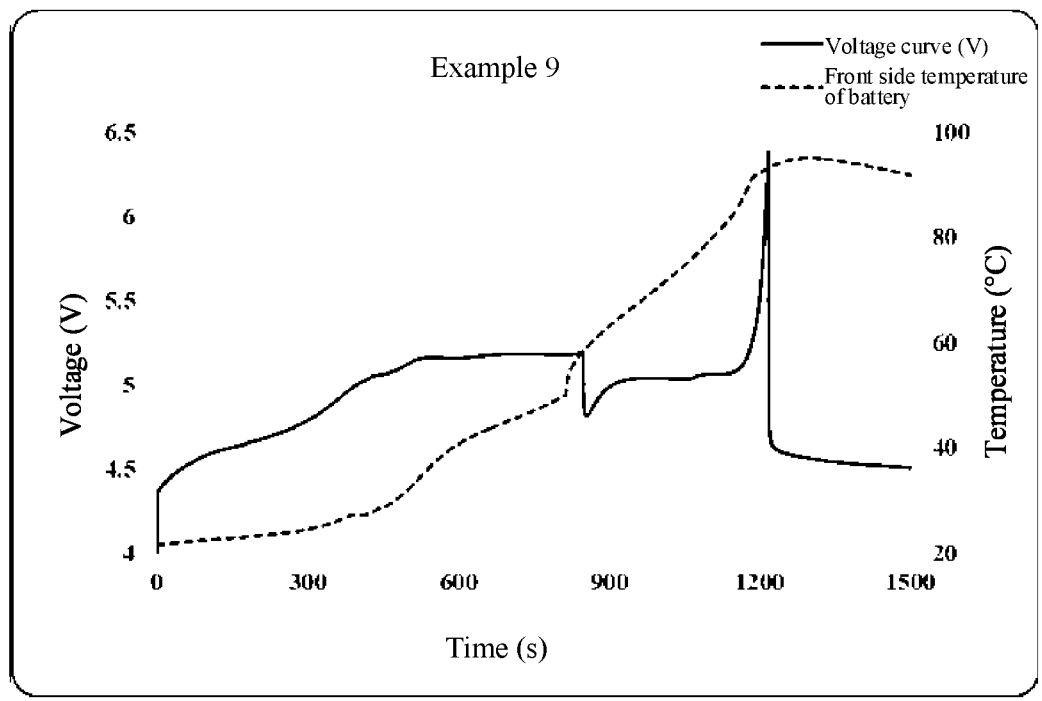
FIG. 1 is a voltage-temperature-time curve of a lithium-ion secondary battery of Example 9 of this application.

REFERENCE SIGNS ARE AS FOLLOWS 1. battery pack;
2. upper box body;
3. lower box body;
4. battery module; and
5. secondary battery.

DESCRIPTION OF EMBODIMENTS

The following will describe this application in detail with reference to specific embodiments. It should be understood that the embodiments described in this specification are merely intended to interpret this application, but not intended to limit this application. The formulations and proportions in the embodiments can be selected as appropriate, but are still within the protection scope of this application.

For simplicity, only some numerical ranges are exemplarily disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded. It should be understood that the enumeration of numerical values is merely giving examples and should not be interpreted as exhaustive.

In the descriptions of this specification, it should be noted that, unless otherwise stated, "more than", "less than", "≤" and "≥" are all inclusive of the present number, "at least one" means including one or more, and "more" in "one or more" means two or more than two.

In an embodiment of this application, a positive electrode plate is provided, including a positive electrode current collector, a positive electrode active material layer disposed on at least one surface of the positive electrode current collector, and a safety layer disposed between the positive electrode active material layer and the positive electrode current collector. In a specific embodiment, the safety layer includes a special sensitive substance.

In an embodiment of this application, each molecule of the special sensitive substance includes monosaccharide structural units, and carbonate groups and/or phosphate groups; and at least part of the carbonate groups and/or phosphate groups are bonded to two or more of the monosaccharide structural units. To be specific, the special sensitive substance is a polymer formed by the monosaccharide structural units and the carbonate groups and/or the phosphate groups.

According to this application, a weight-average molecular weight of the special sensitive substance cannot be excessively high or excessively low. Excessive high molecular weight affects the affinity of the special sensitive substance with the electrolyte and the solubility in preparing the safety layer, causing failure to respond quickly. Excessively low weight-average molecular weight would not only fail to maintain a charge conducting network in the safety layer but also lead to excessively low decomposition voltage or temperature so that the battery cannot function properly. In an embodiment of this application, the weight-average molecular weight Mw of the special sensitive substance is from 1500 to 25000. For example, the weight-average molecular weight Mw of the special sensitive material may be 1500, 1900, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 17000, 18000, 19000, 20000, 21000, 22000, 23000, 24000, or 25000, including any and all ranges and sub-ranges thereof, for example, 1500 to 20000, 1500 to 18000, 1500 to 12000, 1500 to 1900, 2000 to 25000, 2000 to 20000, 2000 to 18000, 2000 to 12000, 3000 to 25000, 3000 to 20000, 3000 to 18000, 3000 to 12000, 3000 to 9000, 3000 to 4500, 2000 to 3000, 9000 to 12000, 6000 to 8000, or 5000 to 7000.

In an embodiment of this application, each molecule of the special sensitive substance contains 10 to 140 carbonate bonds and/or phosphate bonds, for example, 10, 14, 15, 16, 18, 20, 25, 30, 35, 40, 45, 50, 55, 60, 65, 70, 75, 80, 85, 90, 95, 100, 110, 120, 130, or 140, including any and all ranges and sub-ranges thereof, for example, 10 to 140, 10 to 120, 15 to 150, 15 to 120, 25 to 30, 20 to 25, 10 to 14, 16 to 18, 60 to 70, 100 to 120, 130 to 140, 45 to 55, 40 to 50, or 60 to 70. The carbonate bonds and/or phosphate bonds in the molecule of the special sensitive substance allow the special sensitive substance to exhibit good overcharge response speed and suitable response voltage.

In an embodiment of this application, each molecule of the special sensitive substance contains 2 to 60 monosaccharide structural units, for example, 2, 3, 4, 5, 6, 8, 10, 15, 16, 18, 20, 22, 24, 25, 28, 30, 35, 40, 45, 50, 55, or 60, including any and all ranges and sub-ranges thereof, for example, 2 to 60, 2 to 50, 3 to 40, 4 to 50, 5 to 60, 5 to 50, 5 to 30, 8 to 60, 8 to 50, or 8 to 30. In this way, at normal conditions, the special sensitive substance can stabilize a charge conducting network, provide a carrier for the conductive substance, and exhibit proper water solubility in the preparation process.

In an embodiment of this application, the special sensitive substance is selected from at least one of a carbonate ester of monosaccharides, a phosphate ester of monosaccharides, a carbonate and phosphate mixed ester of monosaccharides, a carbonate ester of oligosaccharides, a phosphate ester of oligosaccharides, a carbonate and phosphate mixed ester of oligosaccharides, a carbonate ester of a mixture of monosaccharides and oligosaccharides, a phosphate ester of a mixture of monosaccharides and oligosaccharides, or a carbonate and phosphate mixed ester of a mixture of monosaccharides and oligosaccharides; wherein the oligosaccharide contains 2 to 10 monosaccharide structural units, for example, 2, 3, 4, 5, 6, 7, 8, 9, or 10, including any and all ranges and sub-ranges thereof.

In a specific embodiment, the special sensitive substance is selected from at least one of a carbonate ester of glucose, a carbonate and phosphate mixed ester of glucose, a carbonate ester of sucrose, a carbonate ester of a mixture of glucose and sucrose, a phosphate ester of a mixture of glucose and sucrose, a carbonate ester of γ-cyclodextrin, a phosphate ester of γ-cyclodextrin, a carbonate ester of a mixture of glucose and γ-cyclodextrin, a phosphate ester of a mixture of glucose and γ-cyclodextrin, a carbonate ester of a mixture of sucrose and γ-cyclodextrin, a phosphate ester of a mixture of sucrose and γ-cyclodextrin, or a carbonate ester of degraded cellulose containing 8 monosaccharide structural units.

In an embodiment of this application, each molecule of the special sensitive substance contains 0 to 25 ether bonds, for example, 0, 1, 2, 3, 4, 5, 6, 8, 10, 12, 14, 15, 16, 18, 20, 22, or 25, including any and all ranges and sub-ranges thereof, for example, 0 to 25, 1 to 25, 1 to 20, 1 to 20, 1 to 10, 2 to 25, 2 to 20, 2 to 18, 2 to 16, 2 to 10, 4 to 25, 4 to 20, 4 to 10, 5 to 25, 5 to 20, 5 to 18, or 5 to 10. Tests have shown that a special sensitive substance containing 0 to 25 ether bonds in a single molecule is able to provide a more sensitive degradation site.

The applicant has found that, for a single special sensitive substance molecule containing carbonate bonds and/or phosphate bonds, on the one hand, since carbonate groups and phosphate groups have good compatibility with carbonate groups in common electrolytes, infiltration of the electrolyte is promoted, and when the special sensitive substance undergoes a degradation reaction under overcharge, the carbonate groups and phosphate groups contained in small molecules resulting from breakage have good affinity with the electrolyte, thereby increasing response speed of the safety layer; and on the other hand, an appropriate degree of esterification retains some OH active sites, allowing the special sensitive substance to have proper electrochemical reaction characteristics and to have proper response voltage to prevent overcharge.

The possible degradation principle is that the carbonate groups and the phosphate groups are broken at high voltage, and the monosaccharide structural unit in the special sensitive substance provides a hydroxyl group site for forming carbonate groups or phosphate groups. In addition, free hydroxyl groups are conducive to improving water solubility of the special sensitive substance and facilitate preparation of slurry and coating. In addition, an ether bond in oligosaccharides provides another possible degradation site at high voltage or high temperature for oxidative cleavage.

The special sensitive substance with an excessively large initial amount will affect the conductive effect of the safety layer during normal use. In order for the safety layer to better perform its role, in an embodiment of this application, the special sensitive substance accounts for 20% to 55% of total mass of the safety layer, for example, 20%, 25%, 30%, 35%, 36%, 37%, 40%, 45%, 50%, 52%, or 55%, including any and all ranges and sub-ranges thereof, for example, 20% to 55%, 20% to 50%, 20% to 40%, 20% to 37%, 25% to 37%, 37% to 50%, or 37% to 55%.

According to this application, the safety layer further includes a binding substance, and the embodiments of this application impose no limitations on a type of the binding substance. As an example, in an embodiment of this application, the binding substance includes one or more of polyvinylidene fluoride (PVDF), vinylidene fluoride-hexafluoropropylene copolymers, polyurethane, polyacrylonitrile, polyimide, epoxy resin, silicone resin, ethylene-vinyl acetate copolymers, sodium carboxymethyl cellulose (CMC), styrene-butadiene rubber (SBR), styrene-acrylic rubber, polyacrylic acid, polyacrylic acid-acrylate copolymers, and polyethylene-acrylate copolymers. In a specific embodiment, the binding substance includes one or more of polyvinylidene fluoride, vinylidene fluoride-hexafluoropropylene copolymers, styrene-butadiene rubber, and sodium carboxymethyl cellulose.

When the safety layer includes two or more binding substances, a ratio of the binding substances is not particularly limited provided that the technical solution of this application can be implemented. For example, in a case of two such binding substances, a mass ratio therebetween may be 1:1, 2:8 or 8:2, 3:7 or 7:3, or 4:6 or 6:4.

In one embodiment, the binding substance accounts for 30% to 65% of total mass of the safety layer, for example, 30%, 35%, 40%, 44%, 45%, 50%, 53%, 55%, 60%, or 65%, including any and all ranges and sub-ranges thereof, for example, 30% to 65%, 30% to 60%, 30% to 55%, 30% to 53%, 40% to 65%, 40% to 60%, 40% to 55%, 40% to 50%, 50% to 65%, 50% to 60%, 50% to 55%.

According to this application, the safety layer further includes a conductive substance, and the embodiments of this application impose no limitations on a type of the conductive substance. As an example, the conductive substance includes one or more of a metal conductive material, a carbon-based conductive material, and a conductive polymer material. In a specific embodiment, the metal conductive material includes one or more of aluminum, aluminum alloy, copper, copper alloy, nickel, nickel alloy, titanium, or silver. In a specific embodiment, the carbon-based conductive material includes one or more of Ketjen black, carbonaceous mesophase spherule, activated carbon, graphite, conductive carbon black (Super-P, SP for short), acetylene black, carbon fiber, carbon nanotube (CNT), or graphene. In a specific embodiment, the conductive polymer material includes one or more of polysulfur nitrides, aliphatic conjugated polymers, aromatic conjugated polymers, or aromatic heterocyclic conjugated polymers.

When the safety layer includes two or more conductive materials, a ratio of the conductive substances is not particularly limited provided that the technical solution of this application can be implemented. For example, in a case of two such conductive substances, a mass ratio therebetween may be 1:1, 2:8 or 8:2, 3:7 or 7:3, or 4:6 or 6:4.

In an embodiment of this application, the conductive substance accounts for 6% to 20% of total mass of the safety layer, for example, 6%, 8%, 10%, 13%, 15%, 18%, or 20%, including any and all ranges and sub-ranges thereof, for example, 6% to 20%, 6% to 18%, 6% to 15%, 6% to 10%, 10% to 20%, 10% to 18%, or 10% to 15%.

According to this application, in the safety layer, a mass ratio of the special sensitive substance to the conductive substance is not less than 1.8:1. For example, the mass ratio of the special sensitive substance to the conductive substance may be 1.8:1, 2:1, 2.08:1, 3:1, 3.5:1, 3.7:1, 4:1, 5:1, 6:1, 7:1, 8:1, 8.3:1, or 8.5:1. If the amount of the special sensitive substance is too small or a ratio of the special sensitive substance to the conductive substance is excessively low, degradation and breakage of the special sensitive substance cannot effectively promote breakage of the charge conducting network.

According to this application, the positive electrode current collector is a conventional positive electrode current collector (such as aluminum foil) known in the art that can be used in a capacitor, a primary battery, or a secondary battery, and composition and preparation methods thereof are known in the art and are not limited or further described herein provided that the technical solution of this application can be implemented.

According to this application, at least one surface of the positive electrode current collector is coated with a positive electrode active material layer. In a specific embodiment, one or two surfaces of the positive electrode current collector are coated with the positive electrode active material layer. It should be noted that the safety layer is disposed between the positive electrode current collector and the positive electrode active material layer, and therefore the safety layer has the same quantity as the positive electrode active material layer. To be specific, if one surface of the positive electrode current collector is coated with the positive electrode active material layer, the positive electrode current collector has one safety layer; and if two surfaces of the positive electrode current collector are both coated with the positive electrode active material layer, the positive electrode current collector has two safety layers.

According to this application, the safety layer has no special requirements for thickness, and for example, its thickness may be 1 μm, 1.5 μm, 2 μm, 2.5 μm, or 3 μm, including any and all ranges and sub-ranges thereof, for example, 1 μm to 3 μm, 2 μm to 3 μm, or ≤3 μm. The thickness is not limited or further described herein provided that the technical solution of this application can be implemented.

The positive electrode active material layer used in this application can be selected from various positive electrode active material layers known in the art that are suitable for capacitors, primary batteries, or secondary batteries, and composition and preparation methods thereof are known in the art. The positive electrode active material layer includes a positive electrode active material, which may be a conventional positive electrode active material known in the art that can be used in a capacitor, a primary battery, or a secondary battery, for example, lithium-containing composite metal oxides, and specifically, for example, LiCoO2 (LCO), LiNiO2(LNO), LiMn2O4(LMO), LiFePO4(LFP), one or more of lithium nickel cobalt manganese oxides (NCM) (such as NCM811, MCM523, and MCM622, 811, 523, and 622 for short), or one or more of lithium nickel manganese oxides (NCA), which is not limited or further described herein provided that the technical solution of this application can be implemented.

The positive electrode plate of this application can be prepared according to conventional methods in the art. As an example, the binding substance, conductive substance, and special sensitive substance are dissolved in a solvent at a ratio. The resulting mixture was thoroughly stirred and then applied evenly onto at least one surface of the positive electrode current collector, followed by drying to obtain a safety layer applied on the positive electrode current collector. Then, the positive electrode active material is dissolved in the solvent to form a uniform positive electrode slurry, and the positive electrode slurry is evenly applied onto the surface of the positive electrode current collector that has been coated with the safety layer, and after drying and cold pressing, the positive electrode plate of this application is obtained.

The solvent used in this application is not particularly limited provided that the technical solution of this application can be implemented. For example, the solvent may be an organic solvent, for example, an ether, a hydrocarbon, an ester, a nitrile, an amide, an alcohol, a halogenated hydrocarbon, or the like. In a specific embodiment, the ether is selected from at least one of diethyl ether, tetrahydrofuran, and ethylene glycol dimethyl ether; the hydrocarbon is selected from at least one of n-pentane, n-hexane, cyclohexane, toluene, or xylene, or trimethylbenzene; the ester is selected from at least one of ethyl acetate, methyl formate, and dimethyl phthalate; the nitrile is selected from acetonitrile; the amide is selected from N-methylpyrrolidone (NMP) and/or N,N-dimethylformamide (DMF); the alcohol is selected from at least one of ethanol or propanol; and the halogenated hydrocarbon is selected from methylene chloride and/or 1,2-dichloroethane.

According to this application, the overcharge sensitive substance of the positive electrode plate is degraded at a charging voltage of α V and temperature of β° C., where $4.2 \leq \alpha \leq 5.5$, $4.2 \leq \alpha \leq 4.5$, $4.5 \leq \alpha \leq 4.8$, $4.8 \leq \alpha \leq 5.2$, $5.2 \leq \alpha \leq 5.5$, $5.5 \leq \alpha \leq 6.0$, or $6.0 \leq \alpha \leq 6.5$, and $35 \leq \beta \leq 80$, $35 \leq \beta \leq 40$, $40 \leq \beta \leq 45$, $45 \leq \beta \leq 50$, $50 \leq \beta \leq 55$, $55 \leq \beta \leq 60$, $60 \leq \beta \leq 65$, $65 \leq \beta \leq 70$, $70 \leq \beta \leq 75$, $75 \leq \beta \leq 80$, $80 \leq \beta \leq 85$, $85 \leq \beta \leq 90$, or $90 \leq \beta \leq 95$. A positive electrode plate with the above a and R ranges can ensure both normal use at normal voltage and temperature and reliability of safety performance under overcharge.

In another aspect, this application further provides an electrochemical apparatus, including the positive electrode plate described above. In a specific embodiment, the electrochemical apparatus may be a capacitor, a bare cell, or a primary or secondary battery containing a bare cell, for example, a lithium primary battery, a lithium-ion secondary battery, a sodium-ion battery, or a magnesium-ion battery, but is not limited thereto.

In addition to including the positive electrode plate in this application, the electrochemical apparatus is known in the art in terms of construction and preparation method. The electrochemical apparatus has improved safety and electrical performance (such as cycling performance) because of use of the positive electrode plate in this application. Furthermore, the positive electrode plate of this application can be easily processed, and therefore manufacturing costs of the electrochemical apparatus using the positive electrode plate of this application can be reduced.

When the electrochemical apparatus is overcharged, the special sensitive substance such as polysaccharide carbonated products or polysaccharide phosphorylated products are degraded at a charging voltage of a V and temperature of J° C., where $4.2 \leq \alpha \leq 5.5$, $4.2 \leq \alpha \leq 4.5$, $4.5 \leq \alpha \leq 4.8$, $4.8 \leq \alpha \leq 5.2$, $5.2 \leq \alpha \leq 5.5$, $5.5 \leq \alpha \leq 6.0$, or $6.0 \leq \alpha \leq 6.5$, and $35 \leq \beta \leq 80$, $35 \leq \beta \leq 40$, $40 \leq \beta \leq 45$, $45 \leq \beta \leq 50$, $50 \leq \beta \leq 55$, $55 \leq \beta \leq 60$, $60 \leq \beta \leq 65$, $65 \leq \beta \leq 70$, $70 \leq \beta \leq 75$, $75 \leq \beta \leq 80$, $80 \leq \beta \leq 85$, $85 \leq \beta \leq 90$, or $90 \leq \beta \leq 95$. The special sensitive substance undergoes a chemical reaction, which in turn changes a physical structure of the material, which causes conductive material particles in the safety layer to separate from each other and the charge conducting network to break, making internal resistance of the electrochemical apparatus increase sharply, thereby cutting off the charging current in time, effectively preventing the electrochemical apparatus from thermal runaway, and avoiding safety problems such as fire and explosion, which greatly improves the overcharge safety performance of the electrochemical apparatus.

Compared with the design of using a traditional PTC material as a safety layer, the safety layer including the special sensitive substance in this application has better reliability, allowing an electrochemical apparatus prepared by using a positive electrode plate including such safety layer, for example, a lithium-ion secondary battery, to have better safety. The traditional PTC material whose volume swelling relies on changes in crystallinity only undergoes physical changes at high temperature. Such change is greatly affected by preparation processes of a material coating and the electrochemical apparatus. For example, temperature and coating speed in the preparation process of the material coating and an electrolyte in the electrochemical apparatus all have an uncontrollable effect on crystallinity of the material. When the electrochemical apparatus is overcharged, the material may probably not be excited, and therefore the charging current cannot be cut off in time, posing a safety hazard.

Figure 3:
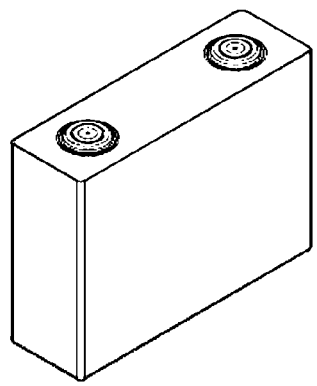
FIG. 3 is a schematic diagram of an embodiment of a secondary battery.

In a specific embodiment of this application, the electrochemical apparatus is a secondary battery. This application does not impose special limitations on a shape of the secondary battery, and the lithium-ion battery may be of a cylindrical shape, a square shape, or any other shapes. FIG. 3 is a secondary battery 5 of a square structure as an example.

In some embodiments, such secondary batteries may be combined to assemble a battery module. The battery module may include a plurality of secondary batteries whose quantity may be adjusted according to the use case and capacity of the battery module.

Figure 4:
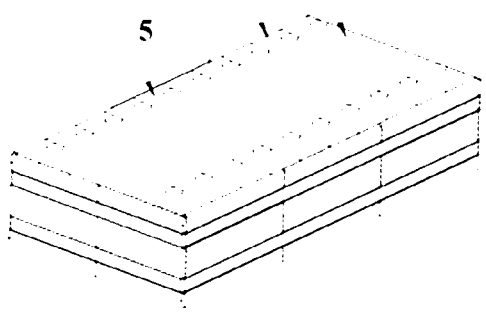
FIG. 4 is a schematic diagram of an embodiment of a battery module.

FIG. 4 shows a battery module 4 used as an example. Referring to FIG. 4, in the battery module 4, a plurality of secondary batteries 5 may be sequentially arranged along a length direction of the battery module 4. Certainly, the plurality of lithium metal batteries 5 may be arranged in any other manners. Further, the plurality of secondary batteries 5 may be fastened by using fasteners.

In some embodiments, the battery module 4 may further include a housing with an accommodating space, and the plurality of secondary batteries 5 are accommodated in the accommodating space.

In some embodiments, such battery modules may be further combined to assemble a battery pack, and a quantity of battery modules included in the battery pack may be adjusted based on the use case and capacity of the battery pack.

Figure 5:
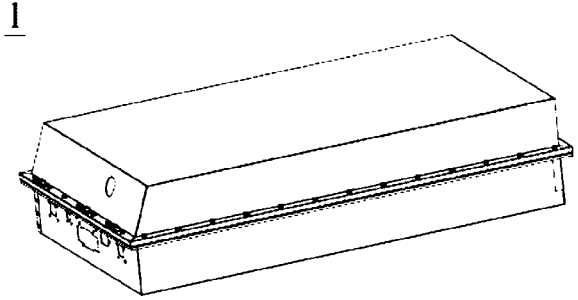
FIG. 5 is a schematic diagram of an embodiment of a battery pack.
Figure 6:
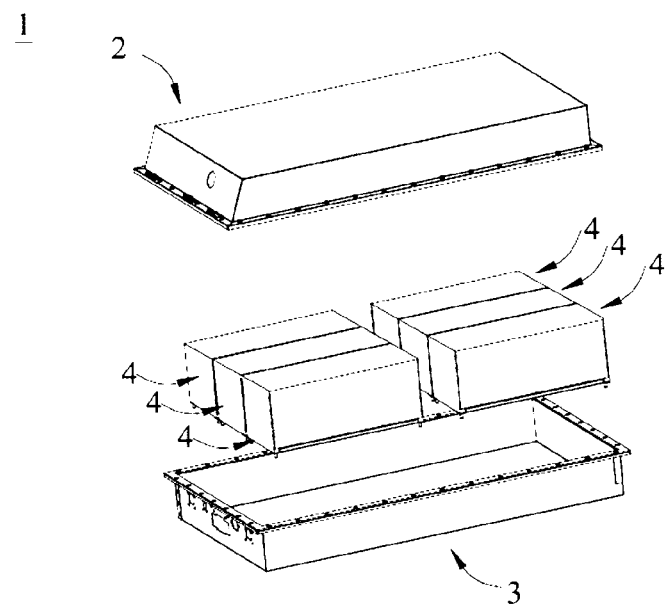
FIG. 6 is an exploded view of FIG. 5.

FIG. 5 and FIG. 6 show a battery pack 1 as an example. Referring to FIG. 5 and FIG. 6, the battery pack 1 may include a battery box and a plurality of battery modules 4 disposed in the battery box. The battery box includes an upper box body 2 and a lower box body 3, where the upper box body 2 can cover the lower box body 3 to form an enclosed space for accommodating the battery modules 4. The plurality of battery modules 4 may be arranged in the battery box in any manner.

Another aspect of this application provides a device that includes the foregoing secondary battery, and the secondary battery can be used as a power source of the device or as an energy storage unit of the device. The device may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery (cell), a battery module (module), or a battery pack (pack) may be selected for the device according to requirements for using the device.

Figure 7:
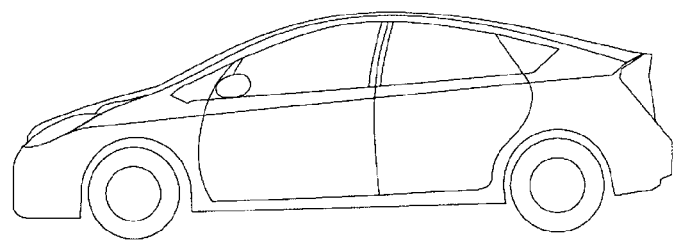
FIG. 7 is a schematic diagram of an embodiment of a device using a secondary battery as a power source.

FIG. 7 is a device as an example. The device is a battery electric vehicle, a hybrid electric vehicle, a plug-in hybrid electric vehicle, or the like. To meet requirements of the device for high power and high energy density of secondary batteries, a battery pack or a battery module may be used.

In another example, the device may be a mobile phone, a tablet computer, a notebook computer, or the like. Such device is generally required to be light and thin, and may use a secondary battery as its power source.

EXAMPLES

This application is further described with reference to specific examples. It should be understood that the following exemplary examples are only used for illustration but do not intend to limit this application. Unless otherwise stated, all percentages and ratios reported in the following examples are based on weight, all reagents used in the examples are commercially available or synthesized in a conventional manner, and can be used directly without further treatment. Experimental conditions not specified in the examples adopt conventional conditions, or adopt conditions recommended by material suppliers or equipment suppliers.

1) Preparation of a Safety Layer

A binding substance, a conductive substance, and a special sensitive substance were dissolved in a solvent at a ratio. The resulting mixture was thoroughly stirred and then evenly applied onto at least one surface of a positive electrode current collector, followed by drying to obtain a safety layer applied onto the positive electrode current collector.

2) Preparation of a Positive Electrode Plate

Positive electrode plate of this application: A positive electrode active material and a solvent were mixed at a ratio.

The resulting mixture was thoroughly stirred to obtain a uniform positive electrode slurry, and then the positive electrode slurry was evenly applied onto a the positive electrode current collector that has been coated with the safety layer in step 1), followed by drying and cold pressing to obtain a positive electrode plate.

Positive electrode plate not of this application: A positive electrode active material, a conductive substance, and a binding substance were mixed at a ratio and dissolved in a solvent. The resulting mixture was thoroughly stirred and evenly applied onto at least one surface of a positive electrode current collector, followed by drying and cold pressing to obtain a positive electrode plate.

The solvents used in step 1) and step 2) could be N-methylpyrrolidone (NMP) and/or N,N-dimethylformamide (DMF), or other types of solvents previously described.

3) Preparation of an Electrolyte

Ethylene carbonate (EC), propylene carbonate (PC), and dimethyl carbonate (DMC) were mixed uniformly at a mass ratio of 1:1:1 to obtain a mixed organic solvent; then a lithium salt LiPF6 was dissolved in the mixed organic solvent. The mixture was mixed uniformly to obtain an electrolyte. A concentration of LiPF6 was 1 mol/L.

4) Preparation of a Lithium-Ion Secondary Battery

The positive electrode plate, a separator porous polyethylene, and the negative electrode plate were stacked in order and the resulting stack was wound to obtain a battery cell; and the battery cell was placed in an outer package, the electrolyte was injected, and then the outer package was sealed to obtain a lithium-ion secondary battery.

Examples 1 to 27

Lithium-ion secondary batteries of this application were prepared in the foregoing method according to specific components and proportions shown in Table 1.

Comparative Examples 1 to 3

Lithium-ion secondary batteries not of this application were prepared in the foregoing method according to specific components and proportions shown in Table 1.

TABLE 1

| | Special sensitive substance | | | | | Conductive substance | | Mass ratio of special sensitive substance to conductive substance | Binding substance | | Safety layer | |
|---|---|---|---|---|---|---|---|---|---|---|---|---|
| | | Molecular weight | Number of carbonate bonds | Number of monosaccharide units | Number of ether | Percentage (wt %) | Conductive substance | Percentage (wt %) | | Binding substance | Percentage (wt %) | Single- or double-sided | Single-sided |
| Example 1 | Carbonate ester of glucose | 3000-4500 | 25-30 | 8 | 0 | 37 | SP | 10 | 3.7:1 | PVDF | 53 | Single-sided | 3 |
| Example 2 | Phosphate ester of glucose | 3000-4500 | 25-30 | 8 | 0 | 37 | SP | 10 | 3.7:1 | PVDF | 53 | Single-sided | 3 |
| Example 3 | Carbonate and phosphate mixed ester of glucose | 3000-4500 | 25-30 | 8 | 0 | 37 | SP | 10 | 3.7:1 | PVDF | 53 | Single-sided | 3 |
| Example 4 | Carbonate ester of sucrose | 3000-4500 | 25-30 | 8 | 4 | 37 | SP | 10 | 3.7:1 | PVDF | 53 | Single-sided | 3 |
| Example 5 | Phosphate ester of sucrose | 3000-4500 | 25-30 | 8 | 4 | 37 | SP | 10 | 3.7:1 | PVDF | 53 | Single-sided | 3 |
| Example 6 | Carbonate ester of a mixture of glucose and sucrose | 3000-4500 | 20-25 | 8 | 5 | 37 | SP | 10 | 3.7:1 | PVDF | 53 | Single-sided | 3 |
| Example 7 | Carbonate ester of a mixture of glucose and sucrose | 1500-1900 | 10-14 | 4 | 1 | 37 | SP | 10 | 3.7:1 | PVDF | 53 | Single-sided | 3 |
| Example 8 | Carbonate ester of a mixture of glucose and sucrose | 2000-3000 | 16-18 | 5 | 2 | 37 | SP | 10 | 3.7:1 | PVDF | 53 | Single-sided | 3 |
| Example 9 | Carbonate ester of a mixture of glucose and sucrose | 9000-12000 | 60-70 | 30 | 10 | 37 | SP | 10 | 3.7:1 | PVDF | 53 | Single-sided | 3 |

TABLE 1-continued

| | Special sensitive substance | | | | | Conductive substance | | Mass ratio of special sensitive substance to conductive substance | Binding substance | | Safety layer | |
|---|---|---|---|---|---|---|---|---|---|---|---|---|
| | | Molecular weight | Number of carbonate bonds | Number of monosaccharide units | Number of ether | Percentage (wt %) | Conductive substance | Percentage (wt %) | | Binding substance | Percentage (wt %) | Single- or double-sided | Single-sided |
| Example 10 | Carbonate ester of a mixture of glucose and sucrose | 18000-20000 | 100-120 | 50 | 20 | 37 | SP | 10 | 3.7:1 | PVDF | 53 | Single-sided | 3 |
| Example 11 | Carbonate ester of a mixture of glucose and sucrose | 22000-25000 | 130-140 | 60 | 25 | 37 | SP | 10 | 3.7:1 | PVDF | 53 | Single-sided | 3 |
| Example 12 | Carbonate ester of γ-cyclodextrin | 6000-8000 | 45-55 | 16 | 16 | 37 | SP | M1 | 3.7:1 | PVDF | 53 | Single-sided | 3 |
| Example 13 | Carbonate ester of a mixture of glucose and γ-cyclodextrin | 6000-8000 | 45-55 | 24 | 8 | 37 | SP | 10 | 3.7:1 | PVDF | 53 | Single-sided | 3 |
| Example 14 | Carbonate ester of a mixture of sucrose and γ-cyclodextrin | 6000-8000 | 45-55 | 24 | 16 | 37 | SP | 10 | 3.7:1 | PVDF | 53 | Single-sided | 3 |
| Example 15 | Carbonate ester of degraded cellulose containing 8 monosaccharide structural units | 4000-6000 | 40-50 | 16 | 14 | 37 | SP | 10 | 3.7:1 | PVDF | 53 | Single-sided | 3 |
| Example 16 | Carbonate ester of a mixture of glucose and sucrose | 9000-12000 | 60-70 | 30 | 10 | 25 | SP | 10 | 1.8:1 | PVDF | 65 | Single-sided | 3 |
| Example 17 | Carbonate ester of a mixture of glucose and sucrose | 9000-12000 | 60-70 | 30 | 10 | 27 | SP | 13 | 2.08:1 | PVDF | 60 | Single-sided | 3 |
| Example 18 | Carbonate ester of a mixture of glucose and sucrose | 9000-12000 | 60-70 | 30 | 10 | 36 | SP | 6 | 6:1 | PVDF | 58 | Single-sided | 3 |
| Example 19 | Carbonate ester of a mixture of glucose and sucrose | 9000-12000 | 60-70 | 30 | 10 | 50 | SP | 6 | 8.3:1 | PVDF | 44 | Single-sided | 3 |
| Example 20 | Carbonate ester of a mixture of glucose and sucrose | 9000-12000 | 60-70 | 30 | 10 | 52 | SP | 18 | 3.7:1 | PVDF | 30 | Single-sided | 3 |
| Example 21 | Carbonate ester of a mixture of glucose and sucrose | 9000-12000 | 60-70 | 30 | 10 | 37 | SP | 10 | 3.7:1 | SBR + CMC | 53 | Single-sided | 3 |

TABLE 1-continued

| | Special sensitive substance | | | | | Conductive substance | | Mass ratio of special sensitive substance to conductive substance | Binding substance | | Safety layer | |
|---|---|---|---|---|---|---|---|---|---|---|---|---|
| | | Molecular weight | Number of carbonate bonds | Number of monosaccharide units | Number of ether | Percentage (wt %) | Conductive substance | Percentage (wt %) | | Binding substance | Percentage (wt %) | Single- or double-sided | Single-sided |
| Example 22 | Carbonate ester of a mixture of glucose and sucrose | 9000-12000 | 60-70 | 30 | 10 | 37 | SP | 10 | 3.7:1 | Vinylidene fluoride-hexafluoropropylene copolymer | 53 | Single-sided | 3 |
| Example 23 | Carbonate ester of a mixture of glucose and sucrose | 9000-12000 | 60-70 | 30 | 10 | 37 | Al powder | 10 | 3.7:1 | PVDF | 53 | Single-sided | 3 |
| Example 24 | Carbonate ester of a mixture of glucose and sucrose | 9000-12000 | 60-70 | 30 | 10 | 37 | CNT | 10 | 3.7:1 | PVDF | 53 | Single-sided | 3 |
| Example 25 | Carbonate ester of a mixture of glucose and sucrose | 9000-12000 | 60-70 | 30 | 10 | 37 | SP + CNT | 10 | 3.7:1 | PVDF | 53 | Single-sided | 3 |
| Example 26 | Carbonate ester of a mixture of glucose and sucrose | 9000-12000 | 60-70 | 30 | 10 | 37 | Acetylene black | 10 | 3.7:1 | PVDF | 53 | Single-sided | 3 |
| Example 27 | Carbonate ester of a mixture of glucose and sucrose | 9000-12000 | 60-70 | 30 | 10 | 37 | SP | 10 | 3.7:1 | PVDF | 53 | Double-sided | 1.5 |
| Comparative example 1 | / | / | / | / | 1 | / | / | / | / | / | / | / | / |
| Comparative example 2 | ./ | / | / | / | / | / | SP | 10 | / | PVDF | 90 | Single-sided | 3 |
| Comparative example 3 | / | / | / | / | / | / | SP | 10 | / | PVDF | 90 | Double-sided | 1.5 |

Performance Test

1) Overcharge Safety Performance Test for the Lithium-Ion Secondary Battery

At 25±2° C., the lithium-ion secondary battery was charged to 4.25V at a constant current rate of 1 C, then charged to a current of 0.05 C at a constant voltage of 4.25V, and then left standing for 30 minutes. Then, the battery was fixed with a clamper and placed on an overcharge safety test device with ambient temperature controlled within 25±2° C. After standing for 5 minutes, the fully charged battery was overcharged at a rate of 1 C, and the real-time voltage and temperature changes of each battery were recorded until the battery caught a fire or exploded, or the charging stopped. Six samples of lithium-ion secondary batteries were tested for each of the examples and comparative examples. The test passed if no battery caught a fire or exploded, and otherwise failed.

2) Cycling Performance Test for the Lithium-Ion Secondary Battery

At 45±2° C., the lithium-ion secondary battery was charged to 4.25V at a constant current of 1 C, charged to a current of 0.05 C at a constant voltage of 4.25V, left standing for 5 min, and then discharged to 2.8V at a constant current of 1 C, which was one charge and discharge cycle. Discharge capacity of this cycle was discharge capacity of the 1st cycle. The lithium-ion secondary battery was tested according to the foregoing method for 100 charge and discharge cycles, and the discharge capacity of each cycle was recorded.

Cycling capacity retention rate (%)=(discharge capacity of the 200th cycle/discharge capacity of the 1st cycle)×100%

The test results of Examples 1 to 27 and Comparative Examples 1 to 3 are shown in Table 2 below.

TABLE 2

| | Pass rate of overcharge safety performance test | Capacity retention rate (%) after 200 cycles at 45° C. |
|---|---|---|
| Example 1 | 3/6 | 94.0 |
| Example 2 | 1/6 | 93.8 |
| Example 3 | 2/6 | 93.9 |
| Example 4 | 6/6 | 94.1 |
| Example 5 | 3/6 | 94.0 |
| Example 6 | 6/6 | 94.1 |
| Example 7 | 4/6 | 93.9 |
| Example 8 | 5/6 | 94.1 |
| Example 9 | 6/6 | 94.5 |
| Example 10 | 5/6 | 94.6 |

TABLE 2-continued

| | Pass rate of overcharge safety performance test | Capacity retention rate (%) after 200 cycles at 45° C. |
|---|---|---|
| Example 11 | 3/6 | 94.3 |
| Example 12 | 6/6 | 94.2 |
| Example 13 | 6/6 | 94.1 |
| Example 14 | 6/6 | 94.3 |
| Example 15 | 6/6 | 94.2 |
| Example 16 | 2/6 | 94.9 |
| Example 17 | 4/6 | 94.6 |
| Example 18 | 6/6 | 94.3 |
| Example 19 | 6/6 | 93.2 |
| Example 20 | 6/6 | 91.9 |
| Example 21 | 6/6 | 94.3 |
| Example 22 | 6/6 | 94.5 |
| Example 23 | 2/6 | 94.1 |
| Example 24 | 4/6 | 93.9 |
| Example 25 | 3/6 | 94.0 |
| Example 26 | 5/6 | 94.2 |
| Example 27 | 6/6 | 94.1 |
| Comparative Example 1 | 0/6 | 92.8 |
| Comparative Example 2 | 0/6 | 93.7 |
| Comparative Example 3 | 0/6 | 93.5 |

It can be seen from Table 1 and Table 2 that the lithium-ion secondary batteries of this application had obviously better safety and electrical performance (such as cycling performance) than Comparative Examples 1 to 3 that used no special sensitive substances.

Figure 2:
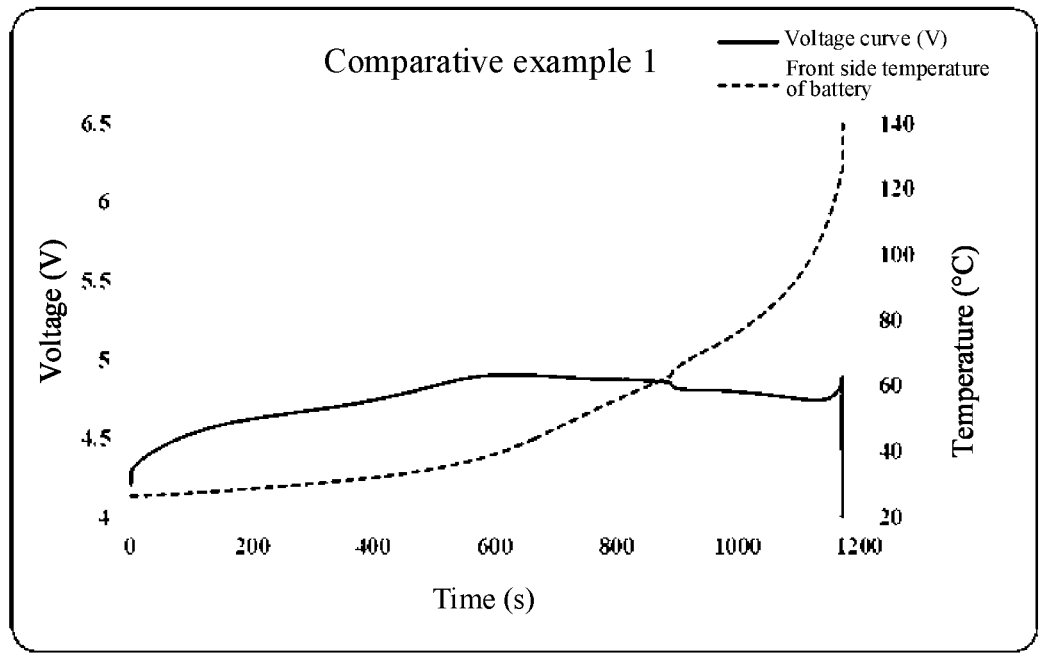
FIG. 2 is a voltage-temperature-time curve of a lithium-ion secondary battery of Comparative Example 1.

FIG. 1 is a voltage-temperature-time curve of the lithium-ion secondary battery of Example 9 according to this application. It can be seen that when the battery was overcharged, the special sensitive substance in the safety layer could respond quickly to cut off external charging current and restrain the battery temperature from rising, thereby improving the overcharge safety performance of the battery. FIG. 2 is a voltage-temperature-time curve of the lithium-ion secondary battery of Comparative Example 1. It can be seen that when the battery was overcharged, the temperature of the battery rose sharply, and the battery failed due to thermal runaway, making the battery prone to safety risks such as fire and explosion. It can be seen from comparing FIG. 1 and FIG. 2 that the lithium-ion secondary battery prepared by adding a special sensitive substance in the safety layer had significantly improved overcharge safety performance.

According to the disclosure and teaching of this specification, those skilled in the art may make further changes or modifications to the foregoing embodiments. Therefore, this application is not limited to the specific implementations disclosed and described above. Some changes and modifications to this application shall also fall within the protection scope of the claims of this application. In addition, although certain terms are used in the specification, these terms are merely used for ease of description and do not constitute any limitation on this application.

What is claimed is:

1. A positive electrode plate, comprising:
a positive electrode current collector,
a positive electrode active material layer disposed on at least one surface of the positive electrode current collector, and
a safety layer disposed between the positive electrode active material layer and the positive electrode current collector;

wherein,
the safety layer comprises a binding substance, a conductive substance, and a special sensitive substance;
wherein each molecule of the special sensitive substance comprises monosaccharide structural units, and carbonate groups and/or phosphate groups; and at least part of the carbonate groups and/or phosphate groups are bonded to two or more of the monosaccharide structural units.

2. The positive electrode plate according to claim 1, wherein a weight-average molecular weight Mw of the special sensitive substance is from 1500 to 25000.

3. The positive electrode plate according to claim 1, wherein each molecule of the special sensitive substance contains 10 to 140 carbonate bonds and/or phosphate bonds.

4. The positive electrode plate according to claim 1, wherein each molecule of the special sensitive substance contains 2 to 60 monosaccharide structural units.

5. The positive electrode plate according to claim 1, wherein each molecule of the special sensitive substance contains 0 to 25 ether bonds.

6. The positive electrode plate according to claim 1, wherein the special sensitive substance is one selected from the group consisting of the following: a carbonate ester of monosaccharides, a phosphate ester of monosaccharide, a carbonate and phosphate mixed ester of monosaccharides, a carbonate ester of oligosaccharides, a phosphate ester of oligosaccharides, a carbonate and phosphate mixed ester of oligosaccharides, a carbonate ester of a mixture of monosaccharides and oligosaccharides, a phosphate ester of a mixture of monosaccharides and oligosaccharides, or a carbonate and phosphate mixed ester of a mixture of monosaccharides and oligosaccharides; wherein the oligosaccharide contains 2 to 10 monosaccharide structural units.

7. The positive electrode plate according to claim 1, wherein the special sensitive substance is one selected from the group consisting of the following: a carbonate ester of glucose, a carbonate and phosphate mixed ester of glucose, a carbonate ester of sucrose, a carbonate ester of a mixture of glucose and sucrose, a phosphate ester of a mixture of glucose and sucrose, a carbonate ester of γ-cyclodextrin, a phosphate ester of γ-cyclodextrin, a carbonate ester of a mixture of glucose and γ-cyclodextrin, a phosphate ester of a mixture of glucose and γ-cyclodextrin, a carbonate ester of a mixture of sucrose and γ-cyclodextrin, a phosphate ester of a mixture of sucrose and γ-cyclodextrin, or a carbonate ester of degraded cellulose containing 2 to 8 monosaccharide structural units.

8. The positive electrode plate according to claim 1, wherein the special sensitive substance accounts for 20% to 55% of total mass of the safety layer.

9. The positive electrode plate according to claim 1, wherein the binding substance comprises one or more of polyvinylidene fluoride, vinylidene fluoride-hexafluoropropylene copolymers, polyurethane, polyacrylonitrile, polyimide, epoxy resin, silicone resin, ethylene-vinyl acetate copolymers, styrene-butadiene rubber, styrene-acrylic rubber, polyacrylic acid, polyacrylic acid-acrylate copolymers, and polyethylene-acrylate copolymers.

10. The positive electrode plate according to claim 1, wherein the binding substance comprises one or more of polyvinylidene fluoride, vinylidene fluoride-hexafluoropropylene copolymers, styrene-butadiene rubber, and sodium carboxymethyl cellulose.

11. The positive electrode plate according to claim 1, wherein the conductive substance comprises one or more of a metal conductive material, a carbon-based conductive material, and a conductive polymer material, wherein the metal conductive material comprises one or more of aluminum, aluminum alloy, copper, copper alloy, nickel, nickel alloy, titanium, and silver; the carbon-based conductive material comprises one or more of Ketjen black, carbonaceous mesophase spherule, activated carbon, graphite, conductive carbon black, acetylene black, carbon fiber, carbon nanotube, and graphene; and the conductive polymer material comprises one or more of polysulfur nitrides, aliphatic conjugated polymers, aromatic conjugated polymers, and aromatic heterocyclic conjugated polymers.

12. The positive electrode plate according to claim 1, wherein in the safety layer, a mass ratio of the special sensitive substance to the conductive substance is not less than 1.8:1.

13. An electrochemical apparatus, comprising the positive electrode plate according to claim 1.

14. The electrochemical apparatus according to claim 13, wherein the electrochemical apparatus may be a capacitor, a primary battery, or a secondary battery.

15. A device, comprising the electrochemical apparatus according to claim 13, wherein the device is one selected from the group consisting of an electric vehicle, an electric ship, an electric tool, an electronic device, and an energy storage system.

16. The positive electrode plate according to claim 1, wherein the binding substance accounts for 30% to 65% of total mass of the safety layer.

17. The positive electrode plate according to claim 1, wherein the conductive substance accounts for 6% to 20% of total mass of the safety layer.

* * * * *